United States Patent [19]
Collier

[11] Patent Number: 4,655,699
[45] Date of Patent: Apr. 7, 1987

[54] REDUCED FLASH MOLDING APPARATUS

[75] Inventor: Barry L. Collier, Akron, Ohio

[73] Assignee: The Uniroyal Goodrich Tire Company, Akron, Ohio

[21] Appl. No.: 587,101

[22] Filed: Mar. 7, 1984

[51] Int. Cl.$^4$ .............................................. B29C 33/00
[52] U.S. Cl. .................................. 425/28 R; 425/36; 425/46; 425/806
[58] Field of Search .................... 425/806, 812, 28 R, 425/28 D, 36, 46, DIG. 42

[56] References Cited

U.S. PATENT DOCUMENTS

| | | | |
|---|---|---|---|
| 1,114,236 | 10/1914 | Dees et al. | 425/36 |
| 1,380,085 | 5/1921 | Walton | 425/46 |
| 1,417,509 | 5/1922 | Gammeter | 425/36 |
| 1,472,887 | 12/1921 | Midgley | 425/36 |
| 1,567,402 | 12/1925 | Venn | 425/806 R |
| 1,615,474 | 1/1927 | Midgley | 264/225 |
| 1,673,525 | 6/1928 | Nelson | 425/36 |
| 1,958,072 | 5/1934 | Sebrell | 264/225 |
| 2,843,880 | 7/1958 | Hermanns | 425/28 |
| 3,057,011 | 10/1962 | Knox | 425/46 |
| 3,406,430 | 10/1968 | Furstenburg et al. | 425/DIG. 42 |
| 3,768,945 | 10/1973 | Waid | 425/806 R |
| 3,957,411 | 5/1976 | Schiesser | 425/DIG. 42 |

Primary Examiner—Willard E. Hoag
Attorney, Agent, or Firm—Harry F. Pepper, Jr.

[57] ABSTRACT

A mold used for forming an elastomeric article such as a tire under heat and pressure is provided with small grooves at seleted locations along the internal cavity walls to reduce or eliminate flash which customarily forms at these locations. Specifically, grooves are provided at the structural interfaces of replaceable mold components, such as tread and bead rings with cavity wall portions of the mold sections. The grooves operate to trap or collect elastomeric material extruded into the interfaces and provide a seal-like barrier to further flash.

1 Claim, 1 Drawing Figure

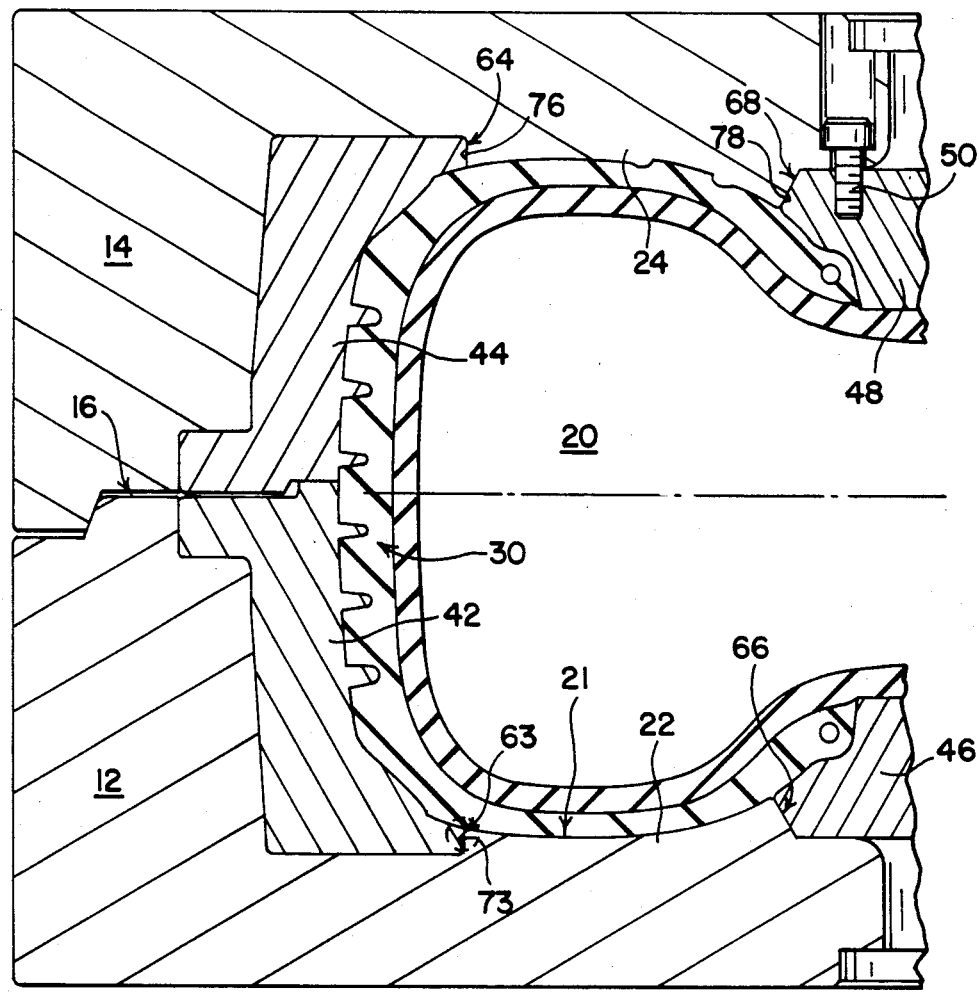
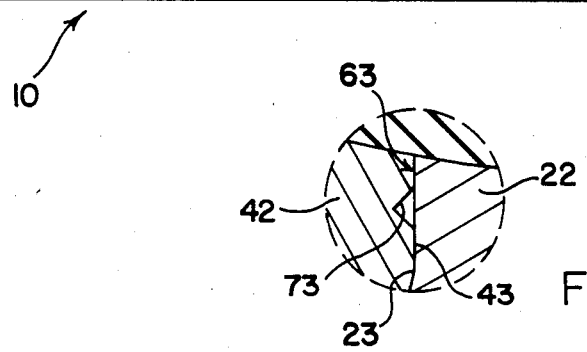

4,655,699

REDUCED FLASH MOLDING APPARATUS

BACKGROUND

The invention relates to molding elastomeric articles and particularly to molding such articles with reduced surface projections or "flash".

In molding elastomeric articles wherein the article is both cured and formed to its final profile in a mold, openings, holes or other like interruptions of the mold cavity wall result in the final article having surface projections or "flash" caused by flow or extrusion of elastomeric material into these openings during the molding operation. It is usually necessary to remove all or major portions of this flash from the article as a final finishing step in the fabrication of the article.

In molding pneumatic tires in typical molds containing upper and lower mold half sections, which separate to remove the articles, such mold flash commonly occurs along the tread periphery which corresponds to the mold section parting line. Projections can also occur on a tire surface at areas corresponding to the vent openings or holes within the mold which are to permit passage of unwanted air from the mold during the initial stages of the molding operation when the article is being formed against the mold cavity wall.

Also, in molds which utilize replaceable mold segments, such as tread and bead segments or "rings", mounted on the mold sections to form parts of the cavity wall, flash can form by elastomeric material flowing or extruding into the junctures or interfaces where the edges of such segments meet with adjacent edges of mold surfaces of the mold sections.

This flash can move deep into these interfaces and form a thermal barrier to proper heat transfer between segments and the mold sections.

SUMMARY

This invention is directed to a method and apparatus to practically eliminate elastomeric mold flash which forms by extrusion into the interface of mold section surfaces and replaceable segments mounted in the mold.

According to the invention, a mold is provided with a groove along the mold section surface/mold segment interface very near the cavity wall. The groove, upon molding an initial article, such as a tire, in the mold, receives or collects elastomeric flash material to form an elastomeric barrier or seal along the inner edge of the interface near the cavity wall. When the initial article is removed from the mold, the barrier or seal remains disposed in the groove. In subsequent cures, the molded articles are relatively flashless at those surface portions formed adjacent the mold section/mold segment interfaces. This is because the elastomeric seal or barrier from the initial cure prevents any substantial extrusion of material into this interface during subsequent cures.

The grooves may be provided in either surface defining the mold section/mold segment interface and coextend with the length of the interface. The grooves may be of any desired cross section, such as triangular, curvilinear or the like. Also, coinciding grooves may be formed, one in each interfacing surface, in order to create or form an elastomeric seal or barrier of larger cross-section.

THE DRAWINGS

The drawing shows a portion of a tire mold in cross section with parts omitted and broken away and includes a depiction of a portion of a tire disposed in the mold. The drawing FIGURE also includes an enlarged extract of a selected part of the mold to further illustrate details of the invention according to a preferred embodiment.

DESCRIPTION OF A PRESENTLY PREFERRED EMBODIMENT

In the drawing FIGURE, a tire mold generally referenced 10 includes annular separable mold halves or sections 12 and 14 which meet or join along a mold parting line generally referenced 16. The mold sections 12 and 14 separate along this parting line when opening the molding for removing a tire after a molding operation and inserting a subsequent uncured or "green" tire therein. The mold closes along this parting line to form a closed mold cavity 20 defined by a toroidal internal wall, generally referenced 21, of the mold.

The mold cavity wall 21 surrounds the cavity with a selected contour to mold a tire such as 30 placed within the mold to a predetermined shape and profile.

The internal cavity wall 21 of the mold is a multipart structure defined by surfaces of: a pair of tire sidewall forming portions 22 and 24 which are integral parts of mold sections 12 and 14, respectively; a tread forming ring segment 42 mounted in mold section 12 and a tread forming ring segment 44 mounted in mold section 14; and a pair of bead forming rings 46 and 48 mounted in mold sections 12 and 14 respectively.

The tread forming ring segments 42 and 44 are fixedly mounted in mold sections 12 and 14 by suitable fastening means (not shown), such as bolts.

As is typically present in molds such as 10, one forming ring, (e.g., 48 in the drawing) is fixedly mounted by bolt means, such as 50, while the other bead ring (e.g., 46 in the drawing) is made movable or "floating" by suitable means (not shown).

To have one bead ring floatable or movable is desirable to facilitate opening or closing of the mold and removal or placement of tires. Thus, while tread forming ring segments 42 and 44, and bead ring 48 are removable, they are fixed parts of the mold proper until such time as a tire of different tread and/or bead contour is to be molded. They are then interchanged with differently contoured rings.

As shown in the drawings, a radially outer portion 23 of sidewall forming portion 22 contacts a radially inner portion 43 of tread forming ring segment 42 to form a lineal division, junction or interface 63 along the mold cavity wall 21. Similarly, sidewall forming portions 24 and tread forming ring segment 44 are in contact on the opposite side of tire 30 forming a lineal division, junction, or interface 64.

Adjacent opposite lower sidewalls of tire 30, portions of sidewall forming portions 22 and 24 contact portions of bead forming rings 46 and 48 to form lineal divisions 66 and 68, respectively. It is noted that interfaces 63, 64 and 68 are such that they remain intact, or are not interrupted when opening mold 10, removing tires after cure and inserting subsequent uncured tires therein.

To prevent or reduce the formation flash into interfaces 63, 64 and 68, each such interface is provided with a small groove 73, 76 and 78 respectively. As seen more clearly by referring to the enlarged extract from the drawing, the groove 73 is substantially triangular in cross-section and is preferably formed in the removable tread forming ring segment 42, rather than in sidewall forming portion 22. It is, however, possible to form a groove such as 73 in the sidewall forming portion 22 along contact portion 23 for example. If larger cross-section grooves are desirable, it is further possible within the scope of the present invention, to form coincidental grooves in both tread forming ring segment 42 and sidewall forming portion 22. The grooves, such as 73, 76 and 78 may be formed by suitable techniques such as machining. Interface 66 is shown provided with no groove because the floating character of bead ring 46 would render such a groove essentially useless for the purpose intended as hereinafter explained.

The grooves 73, 76 and 78 should be located as close to the internal cavity wall 21 as possible while remaining effective for the purpose to be fully explained hereinafter. Such grooves have been found effective when spaced from the cavity wall as little as 0.02 in. (0.51 mm) to 0.03 in. (0.76 mm).

In forming tires in a mold, such as 10, a first tire such as 30 is placed in the mold and exposed to heat and pressure to form the tire against the cavity wall. Extrusions or flash of elastomeric material into interfaces 63, 64 and 68 will "collect" in the grooves 73, 76 and 78 respectively and prevent deeper extrusion within the interfaces. When the initial cure is complete and the tire removed, the extrusions will remain in the grooves and form a seal and barrier to extrusions into the interfaces during subsequent cures.

Although the invention has been described in detail relative to a presently preferred embodiment it is evident from the description that departures from and modifications to that description can be made within the scope of the invention measured by the claim.

I claim:

1. A tire mold used in curing and forming an elastomeric tire to a predetermined shape, said mold including an internal mold cavity defined by a cavity wall contoured to provide said predetermined shape, said mold comprising a principal mold section having at least one sidewall forming surface portion forming a first part of said cavity wall, a removable mold segment secured to said principal mold section and having a tire tread forming surface forming a second part of said cavity wall adjacent said first part; a removable mold segment secured to said principal mold section and having a tire bead forming surface forming a third part of said cavity wall adjacent said first part, each of said removable mold segments having a portion in mutual contact with a portion of said principal mold section wherein said mutually contacting portions remain in contact upon openings of said mold to remove tires after cure and to insert subsequent tires to be cured, said mutually contacting portions creating lineal divisions between said first second, and third parts of said cavity wall, a groove disposed along each of said mutually contacting portions and adjacent each of said lineal divisions, said grooves adapted to recive elastomeric material flowing between said mutually contacting portions during an initial use of said mold such that elastomeric material will fill said grooves and remain to form a barrier to flow of elastomeric material between said first, second and third cavity wall parts during subsequent uses of said mold.

* * * * *